United States Patent Office 2,743,2
Patented Apr. 24, 19

2,743,281
SYNTHETIC LUBRICANTS

Charles F. Feasley, Woodbury, William E. Garwood, Haddonfield, Alexander N. Sachanen, Woodbury, and Francis M. Seger, Pitman, N. J., assignors to Socony Mobil Oil Company, Inc., a corporation of New York No Drawing. Original application August 30, 1951, Serial No. 244,482. Divided and this application July 29, 1955, Serial No. 527,179

4 Claims. (Cl. 260—340.6)

This invention has to do with the condensation of normal alpha mono-olefins, heterocyclic compounds and organic peroxides, and particularly has to do with the new and useful compositions obtained by said condensation.

This application is a division of our application Serial No. 244,482, filed August 30, 1951, which issued as Patent No. 2,743,280 on April 24, 1956.

It is well known in the art to effect a union between molecules of unsaturated hydrocarbons to produce materials called polymers or copolymers, the molecular weights of which are multiples of the molecular weights of the original hydrocarbons. The operation is called polymerization and the conditions of temperatures, pressure, etc., are called polymerizing conditions.

As is also well known to those familiar with the art, polymerization reactions of the type referred to hereinbefore may be conducted at relatively high temperatures and pressures, in the presence of substances or of mixtures of substances that promote the polymerization reaction. These substances are referred to as polymerization catalysts.

Several substances have been proposed as polymerization catalysts, and among the most widely used are phosphoric acid, sulfuric acid, hydrogen fluoride, aluminum chloride, boron trifluoride and solid alumina-silica absorbents. In polymerization processes involving the use of these substances as catalysts, olefinic hydrocarbons are polymerized into polymeric olefinic hydrocarbons, the molecular weight of which, depending upon the conditions of polymerization, may vary within very broad limits from dimers to polymers containing many thousands of carbon atoms. These products may be used as fuels, lubricants, plastics, etc., depending upon their molecular weights.

It is also well known to those familiar with the art, that ethylene and conjugated diolefinic hydrocarbons, such as butadiene, are readily polymerized in the presence of peroxides or oxygen. This has been embodied in numerous processes which are of considerable commercial importance in the production of high molecular weight plastics and elastomers. In contrast to the polymers formed in the polymerization of ethylene or of conjugated diolefinic hydrocarbons in the presence of acidic polymerization catalysts, the products obtained when peroxides or oxygen are utilized as polymerization catalysts are predominantly high molecular weight polymers.

We have discovered that normal, alpha mono-olefins condense, simultaneously, with certain heterocyclic compounds and with organic peroxides, under conditions hereinafter defined, with the formation of desirable viscous oils. The oils so formed are characterized by relatively high specific gravity, high viscosity index and low pour point. Certain of the oils exhibit an unusually high degree of stability to oxidation.

REACTANTS

As indicated above, the mono-olefin reactants of this invention are normal or straight chain alpha mono-olefins. These olefins contain from about 8 to 18 carl atoms. Such mono-olefins are normally liquid at t peratures of the order of 20–25° C. Illustrative of s mono-olefins are the following: n-octene-1, n-decene n-dodecene-1, n-hexadecene-1, n-octadecene-1, and like. Preferred, however, of such olefins are those h ing from 8 to 12 carbon atoms, with n-decene-1 rep senting a particularly desirable olefin. It will be cl from the foregoing examples that an alpha olefin n also be referred to as a 1-olefin.

Not only may the mono-olefins of the aforesaid ch acter be used individually in this invention, but they n also be used in admixture with each other. In additi olefin mixtures containing a substantial proportion such mono-olefins may be used. Preferred of such m tures are those containing a major proportion of a 1-ole or of 1-olefins. Representative of such mixtures are the obtained by the cracking of paraffin waxes and other p affin products, and those obtained from the Fisch Tropsch and related processes.

These hydrocarbon mixtures may contain, in additi to the 1-olefin or 1-olefins, such materials as: other o fins, paraffins, naphthenes and aromatics.

In general, any organic peroxide is suitable for o purpose. By organic peroxide we mean those organ compounds which contain an —O—O— linkage. this connection, it must be clearly understood that wh we speak of organic peroxides herein and in the claims have reference to organic hydroperoxides as well as simp organic peroxides. The organic peroxides utilizable the process of the present invention may be aliphatic pe oxides, aromatic peroxides, heterocyclic peroxides ar alicyclic peroxides. Diethyl peroxide, tertiary butyl h droperoxide, benzoyl peroxide, dimethylthienyl peroxid cyclohexyl peroxide, and lauroyl peroxide may be mei tioned by way of non-limiting examples of organic pe oxides suitable for the process of our invention. In gei eral, we prefer to use those organic peroxides containin the radical

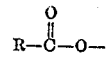

wherein R is an aliphatic or aromatic radical, such a acetyl peroxide, and of these, we especially prefer to us those containing a benzene ring, such as benzoyl peroxide The organic peroxides may be derived from any suitabl source as is well understood and, advantageously, may b formed in situ, thereby obviating the necessity of usin the relatively expensive commercial organic peroxides Such a modification must be considered to be within th scope of the present invention, although the use of in dividual organic peroxides is preferred.

The formation of the organic peroxides in situ may be accomplished in a number of ways. For example, the may be formed in accordance with the procedure of Price and Krebs (Organic Syntheses, 23, 65 (1943)), or b contacting oxygen or air, preferably moist air, with a suitable organic compound such as a hydrocarbon, or an ether, which reacts therewith to form the desired organic peroxide. Ethyl benzene, cyclohexene, and tetralin which readily form peroxides on oxidation, may be mentioned by way of non-limiting examples of organic compounds utilizable for forming the organic peroxides in situ.

In general, and in accordance with our invention, the amounts of organic peroxide to be used are relatively large. In contrast to the polymerization reactions of the prior art which involve conjugated diolefinic hydrocarbons or ethylene wherein organic peroxides function as catalysts in the widely accepted sense of the term, we have found that in our process, the decomposition products of organic peroxides combine with the normal alpha mono-olefins and heterocyclic compounds. Accordingly, the yields and nature of the products obtained in the process of the present invention depend upon the amount of and reflect the type of organic peroxides employed. For instance, when benzoyl peroxide is reacted with a normal, alpha mono-olefin and an aromatic hydrocarbon in accordance with our process, products containing structural fragments of the benzoyl peroxide are formed. This is demonstrated by saponification values for the products. Viewed in this light, our process is one involving both polymerization and the broader and more comprehensive reaction-condensation.

Heterocyclic compounds, by definition, have a closed chain or ring which contains, in addition to carbon, at least one atom of nitrogen, oxygen, sulfur or the like. The heterocyclic compounds used herein are those which are not readily oxidized or which are resistant to oxidation, as shown by a simple test procedure. Equal quantities, 10 cc., of decene-1 and of a heterocyclic compound are mixed in a 25 cc. graduate, and the resulting mixture is allowed to come to equilibrium such that its temperature is the same as the surroundings. One gram of benzoyl peroxide is then added to the mixture, which is agitated by shaking the graduate. The maximum temperature deviation during a ten minute period is noted. An increase in temperature of more than 1° C. (using a temperature measuring means accurate to 0.2° C.) is interpreted as an indication that the heterocyclic compound is easily oxidized and will be inoperative in the present process. In other words, heterocyclic compounds showing a temperature rise of 1° C. or more in this test apparently react so rapidly with the peroxide that there is little or no interreaction of the heterocyclic compound, normal alpha mono-olefin and peroxide.

Illustrative of the heterocyclic compounds contemplated herein and of those which are too readily oxidized to be used are several typical examples given below. In the case of heterocyclic compounds containing oxygen or sulfur, the valence requirements of the oxygen and sulfur (valence of 2) are met by the ring itself. This type of heterocyclic is illustrated by dioxane and by thiophene, each of which has a maximum temperature deviation of only −1° C. The fact that the temperature of the solution decreased indicates that energy was required to dissolve the peroxide. Clearly, no oxidation occurred. Other heterocyclics of this type are: furan, pyran, benzofuran, thiapyran, benzothiophene and thianthrene.

With nitrogen-containing heterocyclic compounds, the valence requirements of the nitrogen (valence of 3) may, or may not be satisfied by the ring. Only those compounds in which the valence requirements are met by the ring are satisfactory. Pyridine, alpha-picoline and quinoline are examples of operative heterocyclic nitrogen compounds, all having a maximum temperature deviation in the foregoing test of −1° C. In contrast, pyrrole and morpholine, which have a hydrogen atom attached to a ring nitrogen atom, have temperature deviations of at least 10° C. and are inoperative herein. Nicotine is characterized by one ring nitrogen atom attached to a methyl group, and exhibits a deviation of +17° C. It will be apparent, then, that nicotine is unsatisfactory in the present process. In addition to pyridine, alpha-picoline and quinoline, other effective and similarly characterized nitrogen-containing heterocyclic compounds include: isopyrrole; 1,3-isodiazole; pyrimidine and acridine.

Mixed heterocyclic compounds meeting the aforesaid test requirement are also considered satisfactory, typical of which are oxazole, thiazole and benzothiazole. Inoperable mixed heterocyclic compounds include morpholine, phenothiazine and 2-mercaptobenzothiazole.

Heterocyclic compounds containing relatively inert substituent groups may also be used in the present process. Typical of such substituent groups are the halides, as represented by chlorine. For example, 2-chlorothiophene has a maximum temperature deviation of −1° C. in the foregoing test. In contrast, a mercapto group is relatively reactive and should be avoided. By way of illustration, 3-thiophene thiol has a maximum temperature deviation of +2° C. As indicated above, 2-mercaptobenzothiazole is also unsatisfactory. Alkyl substituents attached to a ring nitrogen atom such as a methyl group attached to a ring nitrogen atom are also to be avoided, as demonstrated by nicotine which contains an N-methyl grouping.

In accordance with the process of the present invention and depending upon the conditions of operation and the nature of the mono-olefinic hydrocarbon reactants, various condensation products, from comparatively low-boiling to high-boiling fractions, can be synthesized. Thus, in our process, it is possible to produce fractions boiling within the range of those of lubricating oils, i. e., above 700° F. These products are of particular interest and importance. For example, synthetic lubricating oils obtained in accordance with our process generally have high specific gravities, low pour points and good viscosity characteristics. In contrast to synthetic lubricating oils obtained in the processes of the prior art involving solely the polymerization of olefinic hydrocarbons, those of the present invention contain not only paraffinic chains but also contain heterocyclic nuclei and other structural elements depending upon the organic peroxide and heterocyclic material used. Further, the synthetic lubricating oils synthesized by the alkylation of aromatics with olefinic hydrocarbons or chlorinated alkanes will differ materially from those of our invention due to the very nature of the reactions involved. Thus, as is well known, the processes involving alkylation reactions utilize strong catalysts which induce a series of side reactions, such as cracking, isomerization, etc. On the contrary, in our process, the reaction is effected under conditions whereby side reactions, if any, are kept to a minimum, and the temperature conditions are comparatively mild. Accordingly, the utilization of our process for the manufacture of synthetic lubricating oils must be considered a preferred, but nevertheless non-limiting embodiment of our invention.

CONDENSATION CONDITIONS

In carrying out condensation of the aforesaid reactants, temperatures varying between about 50° C. and about 200° C. are usually used, depending primarily, however, upon the kind of organic peroxide employed. In general, temperatures of the order of 80° C. to 140° C. are preferred when peroxides are used, reaction being substantially complete within about ten hours at such temperatures.

When benzoyl peroxide is used, the temperature may vary between about 50° C. and about 150° C. and, preferably, between about 80° C. and 100° C. On the other hand, when hydroperoxides are used, the temperature may vary between about 100 C. and about 200° C., and is preferably of the order of 175° C. The pressure to be employed depends upon the temperature used and, ordinarily, a pressure sufficient to maintain the reactants in substantially a liquid phase at the temperature employed is adequate.

The time of reaction depends upon the temperature, the nature of the reactants employed, the quantity of reactants, and to a certain extent upon the pressure. In general, the higher the temperature employed the shorter the reaction time required, the criterion used being the time required at a given reaction temperature to effect condensation and, more specifically, to assure substantially complete consumption of the organic peroxide. It has been found that the organic peroxide is consumed in the reaction by condensation with the olefin and heterocyclic reactants. This is evidenced by the peroxide fragments present in the oil products. When the peroxide is consumed, no further condensation takes place and oil products are obtained. Thus the time of reaction can be designated as one "sufficient to effect condensation."

Generally, satisfactory results are obtained when the time period is between about five and about fifteen hours, with the reactants and quantities of reactants such as shown in the illustrative examples described hereinafter.

As indicated above, the amounts of organic peroxides and heterocyclic compounds employed determine, to a great degree, the yield and quality of the products. Reaction may be obtained using between about 0.01 and about 0.5 molar proportion of a peroxide, with between about 0.01 to about 6.0 molar proportion of a heterocyclic compound, with one molar proportion of a normal, alpha mono-olefin. Preferably, however, we employ organic peroxides in amounts varying between about 0.05 and about 0.1 molar proportion, with between about 0.1 and about 2.0 molar proportion of heterocyclic compound, with one molar proportion of mono-olefin. In all cases, the quantity of peroxide used is a reactive quantity as distinguished from merely a catalytic quantity, for the peroxide reactant enters into the condensation and fragments thereof form components of the condensation products. This is in sharp contrast with polymerization reactions of the prior art which involve conjugated diolefins or ethylene, wherein organic peroxides function as catalysts in the widely accepted sense of the term "catalysts."

In carrying out the process of the present invention the organic peroxide is added to the mono-olefin and heterocyclic compound, preferably in two or more portions at intervals of a few hours. If desired, the organic peroxide may be added in some instances in a single addition, although excessive heat of reaction may be developed.

When the organic peroxide is formed in situ, a mixture of the mono-olefin and heterocyclic compound, and an organic compound which forms an organic peroxide when subjected to oxidation, in amounts of at least about 5%, preferably at least about 20%, based on the weight of the mono-olefinic hydrocarbon reactant, is contacted with oxygen (air for example) under the conditions of reaction to produce the organic peroxide in situ at the same time that the condensation reaction occurs. The contact with oxygen may be effected by agitation of the mixture in air, bubbling of the air through the mixture, etc.

In another embodiment of this modification, an organic compound is peroxidized to a desired degree before the addition of the olefinic hydrocarbon reactant and the heterocyclic reactant. Yet another modification is to use the mono-olefinic hydrocarbon reactant per se for oxidation to the peroxide, with simultaneous or subsequent reaction to bring about the condensation of the unreacted mono-olefinic hydrocarbon reactant and the heterocyclic reactant, with that portion of the mono-olefinic hydrocarbon which has been converted to peroxide. Still another modification is to use the heterocyclic reactant per se for oxidation to the peroxide, with the simultaneous or subsequent reaction to bring about the condensation of the mono-olefinic hydrocarbon reactant and the unreacted heterocyclic reactant with that portion of the heterocyclic reactant which has been converted to peroxide.

The process may be carried out as a batch, continuous or semi-continuous type of operation. Particularly when the process is carried out on a commercial scale, economic considerations make it preferable to operate in a continuous manner. For efficient operation, whether the process is carried out on a batch or continuous basis, it is essential that the mono-olefinic hydrocarbon reactant be intimately contacted with the organic peroxide and with the heterocyclic compound. This may be effected in several ways and in apparatus which is well known in the art.

EXAMPLES

The following detailed examples are for the purpose of illustrating modes of carrying out the process of our invention. It is to be understood, however, that the invention is not to be considered as limited to specific reactants or to the specific conditions of operation set forth herein. As will be apparent to those skilled in the art, a wide variety of other mono-olefinic hydrocarbon reactants, heterocyclic reactants, and organic peroxides may be used.

The general procedure followed in the making of the example runs was substantially the same in all cases. The olefin reactant and the heterocyclic reactant were stirred together and heated while the peroxide was added at intervals. A temperature of 80 to 90° C. and a time of about nine to ten hours were found sufficient to cause the reaction to go to substantial completion. The crude reaction product was freed of low molecular weight components and the desirable condensation products were obtained as oily residues. Some of the peroxide fragments were eliminated as benzoic acid and then removed by alkali washing or by distillation. This can be considered to be an operating loss. The unreacted olefins, recovered by distillation, were suitable for recycling. The oily product was tested without any other treatment, refining and without additives.

To distinguish the condensation products from the distillate fractions thereof, the oily residues are identified as "residual oils." The latter term identifies the oils from which unreacted materials, by-products (as any benzoic acid) and products of intermediate boiling range have been separated.

All of the tests and analyses to which the residual oils in Table I were subjected are well known standard tests. In this connection, it will be noted that the designation "N. N." refers to the neutralization number, which is a measure of the acidity of the oil.

*Table I*

| Run No. | 1 | 2 | 3 | 4 | 5 | 6 |
|---|---|---|---|---|---|---|
| Mono-olefin | n-Decene-1 | n-Decene-1 | n-Decene-1 | n-Decene-1 | n-Decene-1 | n-Decene-1. |
| Parts by Weight | 140 | 420 | 420 | 70.1 | 420 | 420. |
| Molar Proportion | 1 | 3 | 3 | 0.5 | 3 | 3. |
| Heterocyclic | Thiophene | Dioxane | Pyridine | Alpha-Picoline | Nicotine | Morpholine. |
| Parts by Weight | 84 | 264 | 237 | 279 | 162 | 268. |
| Molar Proportion | 1 | 3 | 3 | 3 | 1 | 3. |
| Peroxide | Benzoyl | Benzoyl | Benzoyl | Benzoyl | Benzoyl | Benzoyl. |
| Parts by Weight | 24 | 72 | 72 | 12 | 72 | 72. |
| Molar Proportion | 0.1 | 0.3 | 0.3 | 0.05 | 0.3 | 0.3. |
| Temperature, °C | 124 | 87 | 87 | 85 | 86 | 95. |
| Time, Hrs | 5 | 9¼ | 9¼ | 9 | 9 | 9½. |
| Residual Oil: | | | | | | |
| Parts by Weight | 37 | 153 [1] | 128 | 10 [2] | 12 | 10. |
| Percent Yield | 14.9 | 20.2 | 17.5 | 2.3 | 1.8 | 1.3. |
| K. V. @ 100° F., Cs | 57.14 | 59.64 | 58.05 | 30.48 | | 19.69. |
| K. V. @ 210° F., Cs | 7.38 | 7.95 | 7.98 | 4.94 | | 3.02. |
| V. I. | 97.57 | 107.9 | 112.1 | 91.2 | | <0. |
| Pour Point, °F | | <-30 | <-30 | | | |
| Br. Addn. No | 24.2 | 13.1 | 15.5 | | | |
| Specific Gravity | 0.9705 | 0.9042 | 0.9129 | | | |
| N. N. | | 1.5 | 1.7 | | | |
| Saponification No. | 124 | | | | | |
| Sulfur, Percent | 3.52 | | | | | |
| Nitrogen, Percent | | | 0.73 | 1.63 | | 7.52. |

Footnotes at end of table.

Table I—Continued

| Run No. | 7 | 8 | 9 | 10 | 11 |
|---|---|---|---|---|---|
| Mono-olefin | n-Decene-1 | n-Decene-1 | n-Decene-1 | n-Hexadecene-1 | n-Hexadecene-1 |
| Parts by Weight | 420 | 420 | 280 | 224 | 224. |
| Molar Proportion | 3 | 3 | 2 | 1.0 | 1.0. |
| Heterocyclic | Mercapto-benzothiazole | Phenothiazine | Thiophenethiol | Thiophene | Thiophene.[2] |
| Parts by Weight | 35 | 50 | 58 | 84 | 84. |
| Molar Proportion | 0.21 | 0.25 | 0.5 | 1.0 | 1.0. |
| Peroxide | Benzoyl | Benzoyl | Benzoyl | Benzoyl | Di-t-butyl. |
| Parts by Weight | 72 | 72 | 24 | 24 | 15. |
| Molar Proportion | 0.3 | 0.3 | 0.1 | 0.1 | 0.1. |
| Temperature, °C | 85 | 87 | 85 | 85 | 140. |
| Time, Hrs | 14 | 9 | 10 | 9 | 8. |
| Residual Oil: | | | | | |
| Parts by Weight | 81 | 11 | 29 | 43 | 99. |
| Percent Yield | 15.2 | 2.0 | 8.0 | 13 | 31. |
| K. V. @ 100° F., Cs | 130.5 | | | 87.26 | 111.5. |
| K. V. @ 210° F., Cs | 8.88 | | | 11.68 | 16.59. |
| V. I | 2.6 | | | 124.5 | 137.3. |
| Pour Point, °F | −20 | | | 30 | 45. |
| Br. Addn. No | | | | 21.7 | 16.1. |
| Specific Gravity | 1.073 | | | 0.9224 | 0.8519. |
| N. N | | | | 3.0 | |
| Saponification No | 119 | | | 85 | |
| Sulfur, Percent | 14.4 | | 33.5 | 3.05 | 0.74. |
| Nitrogen, Percent | 2.89 | | | | |

[1] Percent hydrogen, 12.67; percent carbon, 81.88.
[2] Molecular weight = 407.
[3] Thiophene tended to boil out and periodic re-addition of this material was made.

In Table I above, runs 1–4 illustrate excellent synthetic oils obtained with the present invention. All of the oils of runs 1–4 have high viscosity indices (91–112) and have desirably low pour points. Run 1 is illustrative of an oil obtained with a suitable sulfur-containing heterocyclic compound, thiophene, and run 2 is illustrative of an oil obtained with a suitable oxygen-containing heterocyclic compound, dioxane. Pyridine and alpha-picoline in runs 3 and 4, respectively, illustrate operative nitrogen-containing heterocyclic compounds. The low yield obtained in run 4 with alpha-picoline is due to a high ratio of the heterocyclic compound to olefin; with lower ratios, increasing yields of desirable oils may be obtained.

Run 5 is illustrative of the low degree of reaction or condensation obtained with nicotine, which is too readily oxidized to be used herein.

Run 6, in which morpholine is used, is also illustrative of too readily oxidizable nitrogen-containing heterocyclic compounds. The morpholine product was made from a reaction mixture containing a relatively small amount of morpholine. Low viscosity index and high nitrogen content indicate little reaction of the olefin and much side reaction of morpholine with peroxide.

Mercaptobenzothiazole, in run 7, is another unsatisfactory heterocyclic compound, as shown by the very low viscosity index, 2.6, of the oil product. The high sulfur content of the oil product is indicative of relatively little reaction of olefin, heterocyclic compound and peroxide.

Run 8 shows a mixed heterocyclic compound, phenothiazine, which is too readily oxidized to be of value in this invention. Similarly, run 9 shows a substituted heterocyclic having a highly reactive substituent group, mercapto or thiol.

Runs 10 and 11 are illustrative of oils obtained from a relatively long chain olefin, n-hexadecene-1. It will be noted that these oils have desirably high viscosity indices, 124.5 and 137.3, respectively.

As will be evident from the data presented above in Table I, the condensation products of this invention are highly desirable lubricants per se. They are also of considerable value as blending agents for other lubricating oils. They impart desirable viscosity index (V. I.) and pour point characteristics to the oils in combination therewith, for, as indicated above, they have advantageous viscosity and pour point properties. In short, the synthetic oils find utility in "upgrading" other lubricants. Typical oils with which the synthetic oils may be blended are mineral oils such as are normally used in internal combustion and turbine engines. When so blended, the synthetic oils may comprise the major proportion of the final blended oil, or may even comprise a minor proportion thereof.

One or more of the individual properties of the synthetic lubricants of this invention may be further improved by incorporating therewith a small but effective amount of an addition agent such as an antioxidant, a detergent, an extreme pressure agent, a foam suppressor, a viscosity index (V. I.) improver, etc. Antioxidants for viscous oils are well known in the art, and generally contain sulfur, nitrogen, oxygen and/or phosphorus. Representative of such antioxidants is a phosphorus-and-sulfur containing reaction product of pinene and $P_2S_5$. Typical detergents which may be so used are metal salts of alkyl-substituted aromatic sulfonic or carboxylic acids, as illustrated by diwax benzene barium sulfonate and barium phenate, barium salt of a wax-substituted phenol carboxylic acid. Extreme pressure agents are well known; illustrating such materials are numerous chlorine and/or sulfur containing compositions, one such material being a chlor-naphtha xanthate. Silicones, such as dimethyl silicone, may be used to illustrate foam suppressing compositions. Viscosity index improving agents which may be used are typified by polypropylenes, polyisobutylenes, polyacrylate esters, and the like.

Contemplated also as within the scope of this invention is a method of lubricating relatively moving surfaces by maintaining therebetween a film consisting of any of the aforesaid oils.

It is to be understood that the foregoing description and representative examples are non-limiting and serve to illustrate the invention, which is to be broadly construed in the light of the language of the appended claims.

We claim:

1. An oil of lubricating viscosity characterized by relatively high specific gravity, high viscosity index and low pour point and obtained by: condensing, at a temperature of about 85° C. for about nine hours, one molar proportion of n-decene-1 with one molar proportion of dioxane and 0.1 molar proportion of benzoyl peroxide, and separating said oil from the reaction product thus formed.

2. The process for preparing an oil of lubricating viscosity characterized by relatively high specific gravity, high viscosity index and low pour point which comprises: heating, at a temperature of about 85° C. for about nine hours, one molar proportion of n-decene-1 with one molar proportion of dioxane and 0.1 molar proportion of benzoyl peroxide, and separating said oil from the reaction product thus formed.

3. An oil of lubricating viscosity characterized by relatively high specific gravity, high viscosity index and low pour point and obtained by: heating at a temperature of between about 80° C. and about 140° C. for a period of time between about five hours and about ten hours, one molar proportion of a normal alpha-mono olefin having from about 8 to 18 carbon atoms per molecule, between about 0.01 and about 0.5 molar proportions of an organic peroxide selected from the group consisting of tertiary butyl peroxide and benzoyl peroxide, and from about one to six molar proportions of dioxane, and separating said oil from the reaction product thus formed.

4. The process for preparing an oil of lubricating viscosity characterized by relatively high specific gravity, high viscosity index and low pour point which comprises: heating at a temperature of between about 80° C. and about 140° C. for a period of time between about five hours and about ten hours, one molar proportion of a normal alpha-mono olefin having from about 8 to 18 carbon atoms per molecule, between about 0.01 and about 0.5 molar proportions of an organic peroxide selected from the group consisting of tertiary butyl peroxide and benzoyl peroxide, and from about one to six molar proportions of dioxane, and separating said oil from the reaction product thus formed.

No references cited.